US012803753B2

(12) United States Patent
Wei et al.

(10) Patent No.: US 12,803,753 B2
(45) Date of Patent: Nov. 17, 2026

(54) REFERENCE SIGNALS WITH DIFFERENT RESOURCE DENSITIES

(71) Applicant: ZTE Corporation, Shenzhen (CN)

(72) Inventors: Xingguang Wei, Shenzhen (CN); Jian Li, Shenzhen (CN); Xing Liu, Shenzhen (CN); Wei Gou, Shenzhen (CN); Xianghui Han, Shenzhen (CN); Shuaihua Kou, Shenzhen (CN); Junfeng Zhang, Shenzhen (CN)

(73) Assignee: ZTE Corporation, Guangdong (CN)

( * ) Notice: Subject to any disclaimer, the term of this patent is extended or adjusted under 35 U.S.C. 154(b) by 336 days.

(21) Appl. No.: 18/653,317

(22) Filed: May 2, 2024

(65) Prior Publication Data

US 2024/0283614 A1 Aug. 22, 2024

Related U.S. Application Data

(63) Continuation of application No. PCT/CN2022/107601, filed on Jul. 25, 2022.

(51) Int. Cl.
*H04L 5/00* (2006.01)

(52) U.S. Cl.
CPC ............ *H04L 5/0053* (2013.01); *H04L 5/001* (2013.01); *H04L 5/0048* (2013.01)

(58) Field of Classification Search
CPC . H04W 72/53; H04W 28/26; H04W 72/0453; H04W 72/20; H04L 5/0053; H04L 5/001; H04L 5/0048
See application file for complete search history.

(56) References Cited

U.S. PATENT DOCUMENTS

| | | | | |
|---|---|---|---|---|
| 2010/0014481 | A1 | 1/2010 | Ko et al. | |
| 2014/0086085 | A1* | 3/2014 | Zheng | H04L 5/0092 370/252 |
| 2015/0009925 | A1 | 1/2015 | Park et al. | |

(Continued)

FOREIGN PATENT DOCUMENTS

| | | |
|---|---|---|
| CN | 108633061 | 10/2018 |
| CN | 108781150 | 11/2018 |

(Continued)

OTHER PUBLICATIONS

Extended European Search Report for 22 952 187.7, Report dated Nov. 7, 2024, 9 pages.

(Continued)

*Primary Examiner* — Rushil P. Sampat
(74) *Attorney, Agent, or Firm* — Ashurst Perkins Coie US LLP

(57) ABSTRACT

A method of wireless communication includes transmitting, from a first communication device to a second communication device, an indication of N regions in a resource grid defined by transmission resources in a frequency domain and/or time resources in a time domain and communicating the reference signal between the first communication device and the second communication device according to the density information. Here, each of the N regions has a corresponding resource density indicative of a density of time-frequency resources configured for reference signal transmissions and N is an integer greater than 1.

20 Claims, 14 Drawing Sheets

(56) References Cited

U.S. PATENT DOCUMENTS

| | | | | |
|---|---|---|---|---|
| 2018/0098346 | A1 | 4/2018 | Liu et al. | |
| 2019/0342865 | A1 | 11/2019 | Shin et al. | |
| 2021/0051662 | A1* | 2/2021 | Tang ..................... | H04W 72/23 |
| 2022/0174677 | A1* | 6/2022 | Bi ......................... | H04W 28/26 |

FOREIGN PATENT DOCUMENTS

| | | |
|---|---|---|
| CN | 114503496 | 5/2022 |
| EP | 2698935 | 2/2014 |
| JP | 2016-507195 | 3/2016 |
| JP | 2021-516913 | 7/2021 |
| WO | 2021/066622 | 4/2021 |

OTHER PUBLICATIONS

JPO, Notice of Allowance for Japanese Application No. 2024-557133, mailed on Jan. 16, 2026, 4 pages with unofficial English translation.
ZTE, "Discussion of subband non-overlapping full duplex," 3GPP TSG RAN WG1 #110, Toulouse, France, R1-2205960, Aug. 22-26, 2022, 15 pages.
International Search Report and Written Opinion for PCT/CN2022/107601, filed on Jul. 25, 2022, Report dated Dec. 19, 2022, 9 pages.
Zte, et al. "Discussion on measurement related reference signals" 3GPP TSG RAB WG1 Meeting #87 R1-1611412, Reno, USA, Nov. 14-18, 2016, 7 pages.
Office Action for JP Appl. No. 2024-557133, Office Action dated Oct. 1, 2025, 6 pages with Google translation.

* cited by examiner

REFERENCE SIGNALS WITH DIFFERENT RESOURCE DENSITIES

CROSS-REFERENCE TO RELATED APPLICATION

This application is a continuation and claims priority to International Application No. PCT/CN2022/107601, filed on Jul. 25, 2022, the disclosure of which is hereby incorporated by reference herein in its entirety.

TECHNICAL FIELD

This document relates to systems, devices and techniques for wireless communications.

BACKGROUND

Efforts are currently underway to define next generation wireless communication networks that provide greater deployment flexibility, support for a multitude of devices and services and different technologies for efficient bandwidth utilization.

SUMMARY

Various methods and apparatus for achieving different reference signal densities in a wireless communication system are described.

In one example aspect, a method of wireless communication is disclosed. The method includes transmitting, from a first communication device to a second communication device, an indication of N regions in a resource grid defined by transmission resources in a frequency domain and/or time resources in a time domain and communicating the reference signal between the first communication device and the second communication device according to the density information. Here, each of the N regions has a corresponding resource density indicative of a density of time-frequency resources configured for reference signal transmissions and N is an integer greater than 1.

In another example aspect, a method of wireless communication is disclosed. The method includes receiving, from a first communication device by a second communication device, an indication of N regions in a resource grid defined by transmission resources in a frequency domain and/or time resources in a time domain and communicating the reference signal between the first communication device and the second communication device according to the density information. Here, each of the N regions has a corresponding resource density indicative of a density of time-frequency resources configured for reference signal transmissions and N is an integer greater than 1.

In yet another example aspect, a wireless communications apparatus comprising a processor is disclosed. The processor is configured to implement methods described herein.

In another example aspect, the various techniques described herein may be embodied as processor-executable code and stored on a computer-readable program medium.

The details of one or more implementations are set forth in the accompanying drawings, and the description below. Other features will be apparent from the description and drawings, and from the claims.

DETAILED DESCRIPTION

Section headings are used in the present document only to improve readability and do not limit scope of the disclosed embodiments and techniques in each section only to that section. Furthermore, some embodiments are described with reference to Third Generation Partnership Project (3GPP) New Radio (NR) standard ("5G") for ease of understanding and the described technology may be implemented in different wireless system that implement protocols other than the 5G protocol.

In the existing NR system, various reference signals have been specified for measuring the interference for wireless communication, e.g., DM-RS (Demodulation reference signals), CSI-RS (Channel State Information Reference Signal) and SRS (Sounding Reference Signal). A typical reference signal is a signal whose properties are defined a priori such that a receiver of the reference signal knows what to expect. Existing reference signals are typically configured to have the same frequency density over the frequency domain. For example, frequency density may be measured in terms of number of subcarriers or resource blocks assigned to the reference signal over a unit of frequency.

However, for scenarios with different interferences over the frequency domain, e.g., subband full duplex and dynamic time division duplexing (TDD), configuring reference signals with the same frequency density over an entire frequency bandwidth may cause undesirable resource overhead. For example, in a frequency spectrum with a strong or dynamic interference, it may be better to have high frequency density allocated to reference signal transmissions, e.g., to be able to characterize and calibrate that portion of the frequency spectrum more accurately and quickly. Conversely, in frequency spectral region with low and stable interference, it may be more appropriate to have a lower frequency density of reference signal to save transmission resources for other transmission such as data transmissions. Similar issues also exist in time domain if the interference is different over time domain. However, present day systems fail to appreciate such a need and consequently do not provide a way by which reference signals transmission with varying resource densities, e.g., time or frequency densities, may be configured and used by wireless communication systems.

This document discloses various techniques that may be used, among other things, by embodiments to configure and use reference signal with different frequency or time resource densities.

1. Initial Discussion

Figure 1:
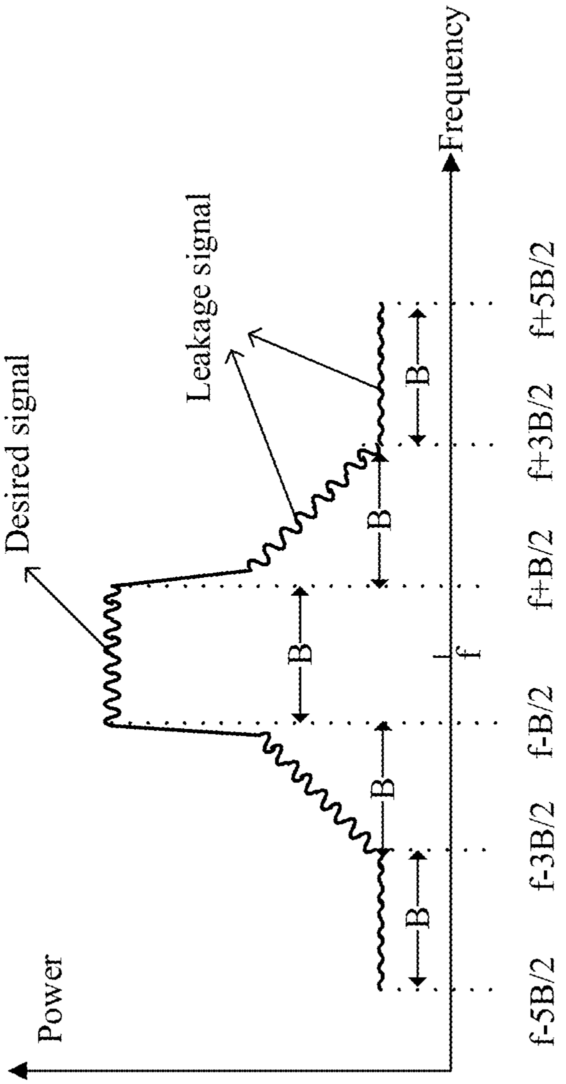
FIG. 1 shows an example of a typical frequency spectrum of a wireless signal.

In wireless communication, signals need to be filtered before transmitting over the medium so that the transmitted signal power can be restricted within the desired frequency range. Ideally, after filtering, there should be no leakage signal out of the desired frequency range. However, due to the limitation of technology and implementation complexity, typically there is non-zero signal power, sometimes called leakage signal, outside the desired frequency range. FIG. 1 shows an example of a typical output signal after the filtering operation. In FIG. 1, the horizontal axis represents frequency, and the vertical axis represents signal power. For a desired signal with center frequency at f and with bandwidth B, the leakage signal within bandwidth B that is adjacent to the desired signal (i.e., from f−3B/2 to f−B/2 and from f+B/2 to f+3B/2) is stronger than the leakage signal with bandwidth B that is further away from the desired signal (e.g., from f−5B/2 to f−3B/2 and from f+3B/2 to f+5B/2). Meanwhile, the leakage signal within bandwidth B that is adjacent to the desired signal is more dynamic. The leakage signal will be the interference to the desired signal within frequency resource from f−5B/2 to f−B/2 and from f+B/2 to f+5B/2. This is also known as "roll-off filter."

To help demodulate the desired signal and ensure optimal operation of the channel between the transmitter and the receiver, the receiver typically measures the interference. Reference signals are transmitted to help with the interference measurement. However, reference signal transmissions take away bandwidth from other traffic such as user data. Therefore, reference signal transmissions are typically performed only at some frequencies and some time occasions, and channel estimates obtained by receive reference signals at these times or frequencies are interpolated to obtain a channel estimate over the entire frequency band of interest and over an entire time period. The receiver can measure the interference and more accurately and thus demodulate the desired signal more accurately if reference signals are transmitted frequently in the time domain or close together in the frequency domain. However, transmitting more reference signals leads to more resource overhead. To handle this situation, transmitter can transmit more reference signal in the frequency resource with strong and dynamic interference (e.g., from f−3B/2 to f−B/2 and from f+B/2 to f+3B/2) and transmits less reference signal in the frequency resource with lower and stable interference (e.g., from f−5B/2 to f−3B/2 and from f+3B/2 to f+5B/2).

In some embodiments, the available transmission resources may be defined over a grid o in the time domain and in the frequency domain, e.g., using an orthogonal frequency division multiplexing access (OFDMA) scheme defined by 3GPP for Long Term Evolution or NR technologies. In such systems, a transmitter transmits reference signal to the receiver in one or more resource elements. Each resource element is uniquely identified by an index in the frequency domain and an index in the time domain, where the index in time domain refers to the symbol position in the time domain relative to some reference point.

The reference signal has different frequency densities over the frequency domain. The receiver measures the reference signal to help demodulate the desired signal or to monitor the interference state.

In various embodiments, the techniques described herein may be implemented in transmitter-receiver configurations as follows.

- The transmitter is a base station and the receiver is UE (User equipment). In this case, the reference signal is used for the UE to demodulate the DL (Downlink) signal.
- The transmitter is the UE and the receiver is the base station. In this case, the reference signal is used for the base station to demodulate the UL (Uplink) signal.
- The transmitter is the base station and the receiver is also base station. In this case, the reference signal is used for interference measurement between base stations.
- The transmitter is the UE and the receiver is also UE. In this case, the reference signal is used for interference measurement between UEs.

2. Examples of Different Regions with Different Resource Densities

Figure 2:
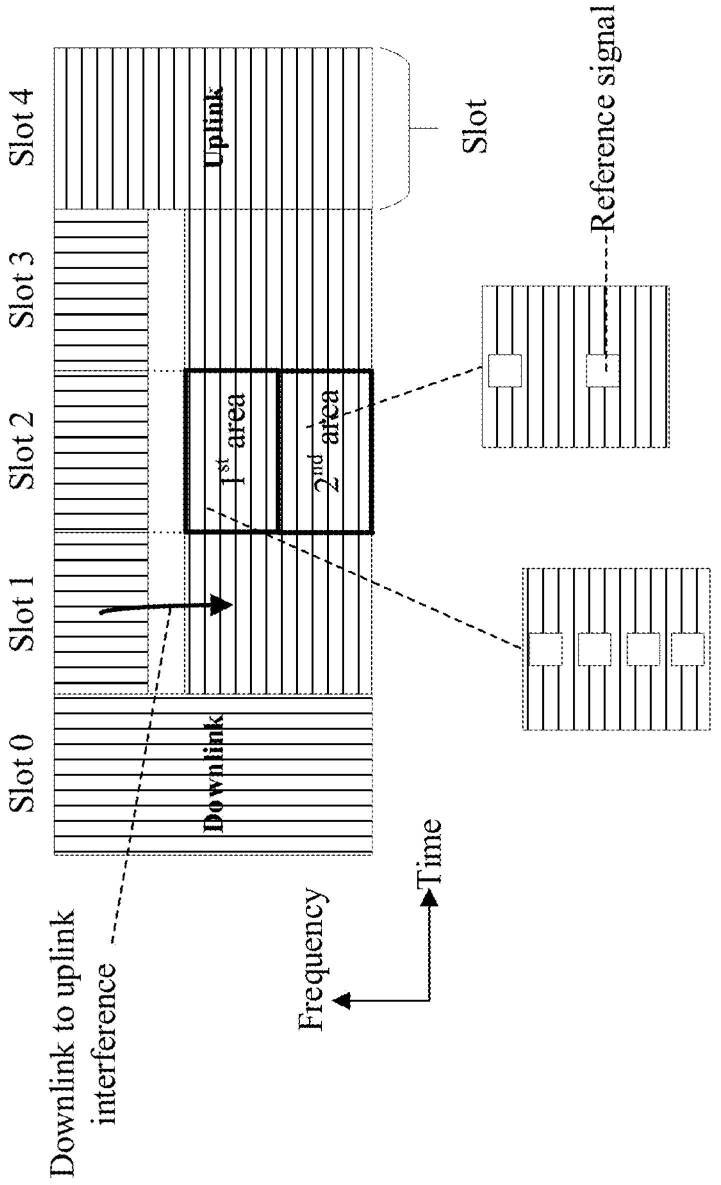
FIG. 2 shows an example of a configuration in which downlink to uplink interference may be experienced at a network side.

In a subband full duplex system, the base station can transmit and receive at the same time. FIG. 2 is an example of subband full duplex system at the base station side. FIG. 2 shows an example of a two-dimensional resource grid in which horizontal axis represents time (in units of slots) and vertical axis represents frequency domain. A similar visual rendering scheme is also used for FIGS. 3 to 6, wherein additionally reference signal resource are shown with diagonal hatch lines. Regions allocated to uplink transmissions are shown by horizontal hatch lines and regions allocated to downlink transmissions are shown by vertical hatch lines. In this example, the bandwidth of uplink frequency resource in Slot 1/2/3 is about 2 times of that for downlink. There is a guard band between the downlink resource and uplink resource in Slot 1/2/3. The guard band can be several RBs (Resource blocks) and it can also be zero RB. During Slot 1, Slot 2 and Slot 3, base station needs to transmit and receive at the same time. However, in Slot 0, base station only needs to transmit since only downlink resource are allocated there. Similarly, in Slot 4, base station only needs to receive since only uplink resource are allocated there.

The transmitting signal is of much higher power than the receiving signal from base station side. There may be downlink to uplink interference because the leakage signals from the transmitting signal are fallen into the receiving signal. Due to the "roll-off filter", the downlink to uplink interference may be stronger and more dynamic in the area that is closer to the downlink resource, i.e., the 1st area. And the interference can lower and flat in the 2nd area. Thus, the reference signal in the 1st area can have higher frequency density over frequency domain and reference signal in the 2nd area can have lower frequency density.

Figure 3:
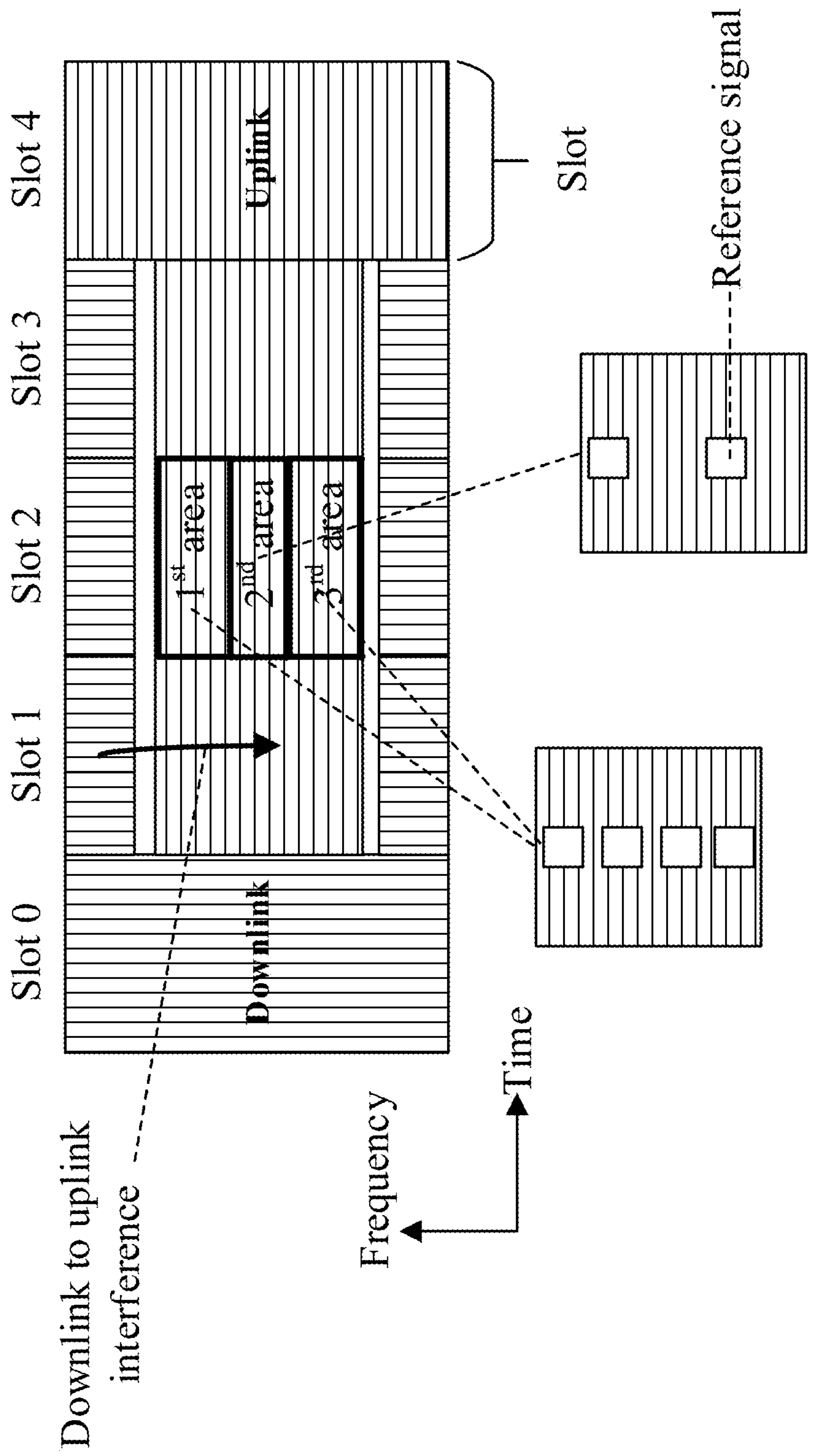
FIG. 3 shows an example of a configuration in which downlink to uplink interference may be experienced at a network side.

FIG. 3 is another example of subband full duplex system at the base station side. The downlink resources are configured at both sides of the uplink resources. In this example, the bandwidth of uplink frequency resource in Slot 1/2/3 is about 3 times of that for downlink at each side. Due to the "roll-off filter", the downlink to uplink interference may be stronger and more dynamic in the area that is closer to the downlink resource, i.e., the 1st area and the 3rd area. And the interference can lower and flat in the 2nd area. Thus, the reference signal in the 1st area and the 3rd area can have higher frequency density over frequency domain and reference signal in the 2nd area can have lower frequency density.

Figure 4:
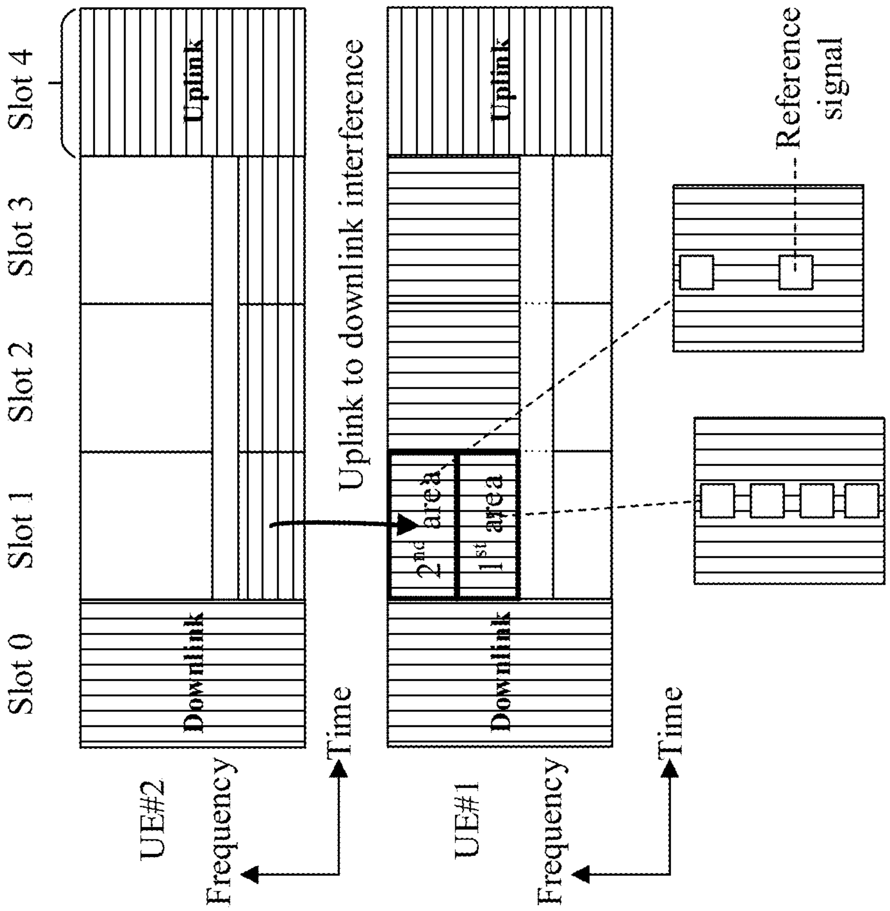
FIG. 4 shows an example of a configuration in which uplink to downlink interference may be experienced at a wireless device side.

FIG. 4 is an example of subband full duplex system at the UE side. UE #1 and UE #2 are operated in the same carrier, e.g., both of them are operated at 2.6 GHz with 60 MHz bandwidth. The UE is operated in half-duplex mode, which means that UE is not able to transmit and receive at the same time. In Slot 1/2/3, UE #1 is receiving downlink and UE #2 is transmitting uplink. Similarly, the transmitting signal of UE #2 is of much higher power than the receiving signal of UE #1. There may be uplink to downlink interference because the leakage signals from the transmitting signal of UE #2 are fallen into the receiving signal of UE #1 if UE #1 is located close to the UE #2 physically.

In this example, the bandwidth of downlink frequency resource in Slot 1/2/3 is about 2 times of that for uplink. Due to the "roll-off filter", the uplink to downlink interference may be stronger and more dynamic in the area that is closer to the uplink resource, i.e., the 1st area. The interference can lower and flat in the 2nd area. Thus, the reference signal in the 1st area can have higher frequency density over frequency domain and reference signal in the 2nd area can have lower frequency density.

Figure 5:
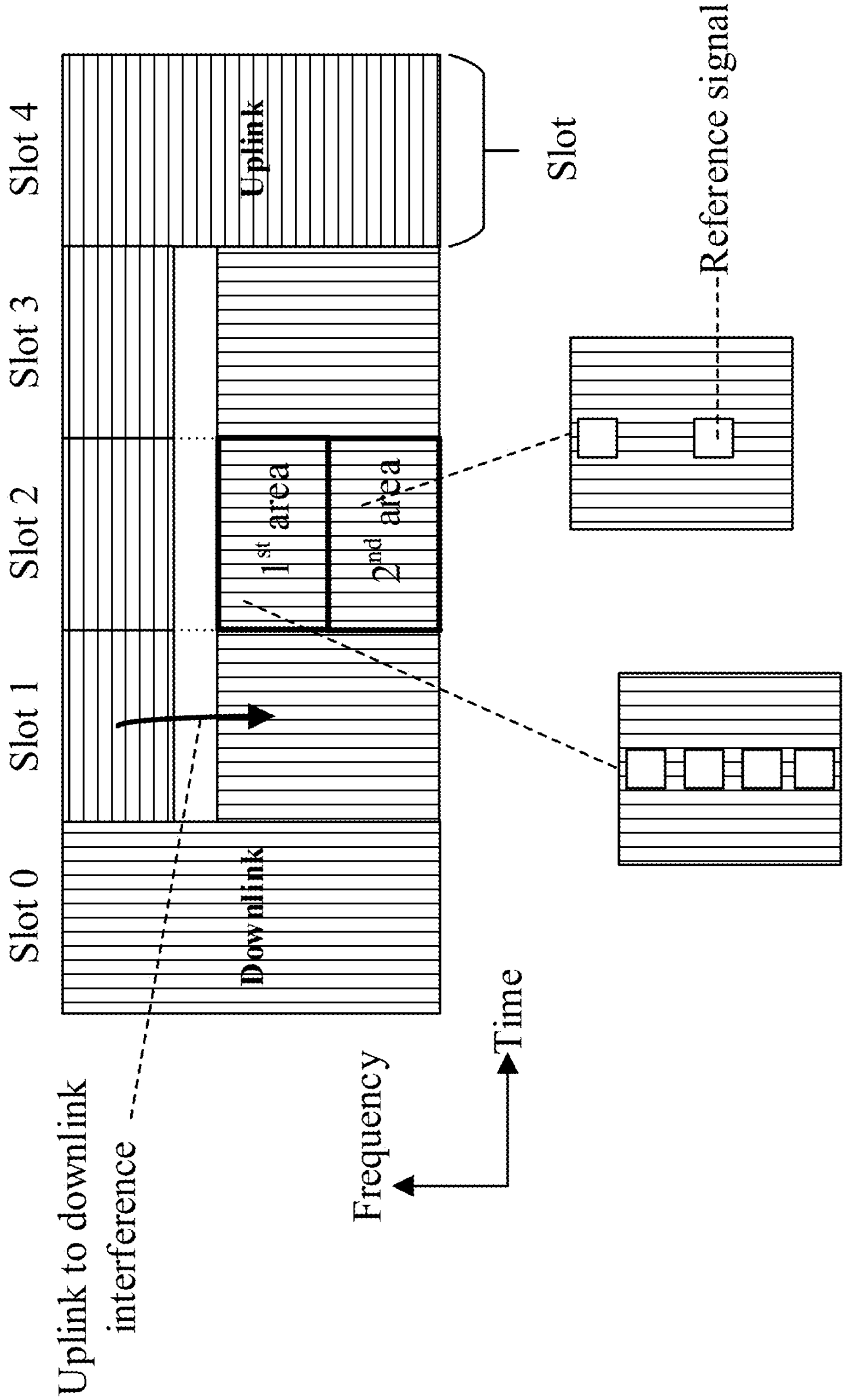
FIG. 5 shows an example of a configuration in which uplink to downlink interference may be experienced at a wireless device side.

FIG. 5 is another example of subband full duplex system at the UE side. The UE is able to transmit and receive at the same time in Slot 1/2/3. Similarly, the transmitting signal is of much higher power than the receiving signal. There may be uplink to downlink interference because the leakage signals from the transmitting signal are fallen into the receiving signal. Due to the "roll-off filter", the uplink to downlink interference may be stronger and more dynamic in the area that is closer to the uplink resource, i.e., the 1st area. The interference can lower and flat in the 2nd area. Thus, the reference signal in the 1st area can have higher frequency density over frequency domain and reference signal in the 2nd area can have lower frequency density.

Although only examples of subband full duplex are described here, the reference signal with different frequency densities can be applied to any scenarios if the characteristics of interference (e.g., strength and changing rate) are different over different frequency resources. For example, full duplex systems, dynamic TDD systems, TDD systems with different slot formats among cells, cells with co-channel or adjacent channel interference.

Although only 2 or 3 areas are described here as example, the number of areas can be larger than 3. Practically, the number of areas should be determined by the interference and implementation algorithm. For example, if the characteristics of interference are clearly different among 4 areas, then 4 areas can be configured.

Base station configures and indicates N areas to the UE or to the base station, each area is associated with one frequency density for reference signal. N is integer number larger than 1. If the areas are configured for downlink, then base station transmits the reference signal with the corresponding frequency density associated with each area. If the areas are configured for uplink, the UE transmits the reference signal with the corresponding frequency density associated with each area.

Each area can be determined by the frequency domain resource (or frequency resource for simplicity) and time domain resource. The frequency domain resource of area can be determined by one of the following alternatives.

Alt.1. Base station configures the frequency resources associated with each area. Each area can have one or multiple RBs or PRGs (Resource Block Groups).

Alt.2. Base station configures the number of areas. Base station and/or UE determines the frequency resources of each area based on the number of areas and the total number of RBs/PRGs of downlink or uplink. For example, if the total number of RBs for uplink is 90 RBs and the number of areas is 3, then each area contains 30 RBs. If the total number of RBs are not divisible by the number of areas, specific rules can be used to determine the number of RBs for each area. For example, the first (or last) area can have less RBs and all other areas can have the same number of RBs. If the total number of RBs for uplink is 86 RBs and the number of areas is 3, then first area and second area will have $\lceil 86/3 \rceil = 29$ RBs and the third area will have $86-29*2=28$ RBs. Here $\lceil\ \rceil$ represents the ceiling function.

The time domain resource of area can be determined by one of the following alternatives.

Alt.1. Base station doesn't configure any time domain resource for each area. In this case, all the slots/symbols are associated with each area. For example, if two areas are configured for uplink, then all the uplink slots/symbols are associated with these two areas.

Alt.2. Base station doesn't configure any time domain resource for each area. In this case, for subband full duplex system, all the slots/symbols where base station or UE can transmit and receive at the same time are associated with each area. Take FIG. 2 as an example, if the base station doesn't configure time domain resource for the 1$^{st}$ area and the 2$^{nd}$ area, then it means all the three slots (Slot 1, Slot 2 and Slot 3) are associated with the 1$^{st}$ area and the 2$^{nd}$ area because base station can transmit and receive at the same time in these three slots.

Alt.3. Base station configures the time domain resource for the areas. The time domain resources can be configured in the units of frame, sub-frame, slot, sub-slot, symbols, second or millisecond. Take Figure as an example, Slot 2 are configured as the time domain resources for the 1st area and 2nd area.

The frequency density for the reference signal indicates the density of the reference signal in the frequency domain. The frequency density of each area can be determined by one of the following alternatives.

Alt.1. Base station configures the frequency density associated with each area. Take FIG. 2 as an example, base station can configure the frequency density for the 1$^{st}$ area as "4", which means there are 4 REs transmitting reference signal in every RB. Base station can configure the frequency density for the 2$^{nd}$ area as "2", which means there are only 2 REs transmitting reference signal in every RB. Here the density "4" and "2" are only example values. Base station can use other values/parameters to indicate the density as long as the base station and UE can have the same understanding.

Alt.2. Base station configures the frequency density associated with the reference area and configures another scaling factor for the other area. Take FIG. 2 as an example, base station can configure the frequency density for the 1$^{st}$ area as "4" and configure a scaling factor as "½" for the 2$^{nd}$ area. Thus, it can be derived that the frequency density for the 2$^{nd}$ area is "2".

Alt.3. The frequency density for each area is specified in the specification.

Alt.4. The frequency density for each area is indicated or updated by MAC-CE.

Below are some examples of frequency density.

1. The reference signal is transmitted in each RE of each RB within the area;
2. The reference signal is transmitted in each odd RE (or even RE) of each RB within the area;
3. The reference signal is transmitted in the $6^{th}$ RE of the odd RB within the area;
4. The reference signal is transmitted in the $2^{nd}$ RE and $8^{th}$ RE of every 6 RBs within the area, e.g., RB with RB index m and m mod 6=1.

The transmitter transmits the reference signal with a certain frequency density and the receiver determines frequency resource of the reference signal based on the frequency density. Then the receiver can measure the reference signal in the corresponding determined frequency resource.

If the frequency resource of the reference signal is fully within one area, then the frequency density of the reference is the frequency density associated with this area.

If the frequency resource of the reference signal is across more than one area, one of the following alternatives can be applied.

Alt.1. The frequency density of the associated area is used for the frequency resource of the reference signal that is within the associated area. Thus, there can be multiple frequency densities for one reference signal.

Alt.2. The frequency density of the reference signal is determined by frequency density associated with the area that is overlapping with the lowest RB of the reference signal.

Alt.3. The frequency density of the reference signal is determined by frequency density associated with the area that is overlapping with the highest RB of the reference signal.

Alt.4. The frequency density of the reference signal is determined by the frequency density associated with the area with the lowest index that is overlapping the reference signal.

Alt.5. The frequency density of the reference signal is determined by the frequency density associated with the area with the highest index that is overlapping the reference signal.

Alt.6. The frequency density of the reference signal is determined by the frequency density associated with the area with the highest frequency that is overlapping the reference signal.

Alt.7. The frequency density of the reference signal is determined by the frequency density associated with the area with the lowest frequency that is overlapping the reference signal.

Figure 6:
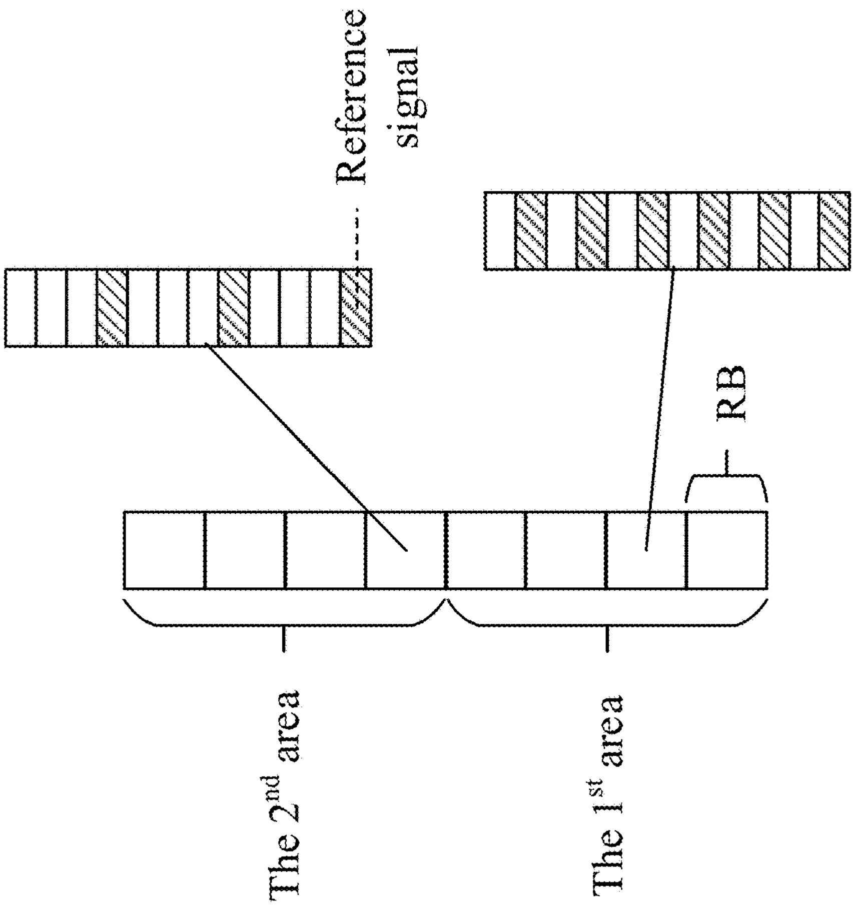
FIG. 6 shows an example of transmission resources configured for reference signal transmission.

Take FIG. 6 as an example, there are 8 RBs in the frequency domain in total and they are divided into two areas, i.e., the $1^{st}$ area and the $2^{nd}$ area. The reference signal is transmitted in the 8 RBs. The frequency density of the $1^{st}$ area is higher than the frequency density of the $2^{nd}$ area. In the $1^{st}$ area, the reference signal is transmitted in odd REs of all the 4 RBs. In the $2^{nd}$ area, the reference is transmitted in the $1^{st}$ RE, the $5^{th}$ RE and the $9^{th}$ RE of all the 4 RBs.

Figure 7:
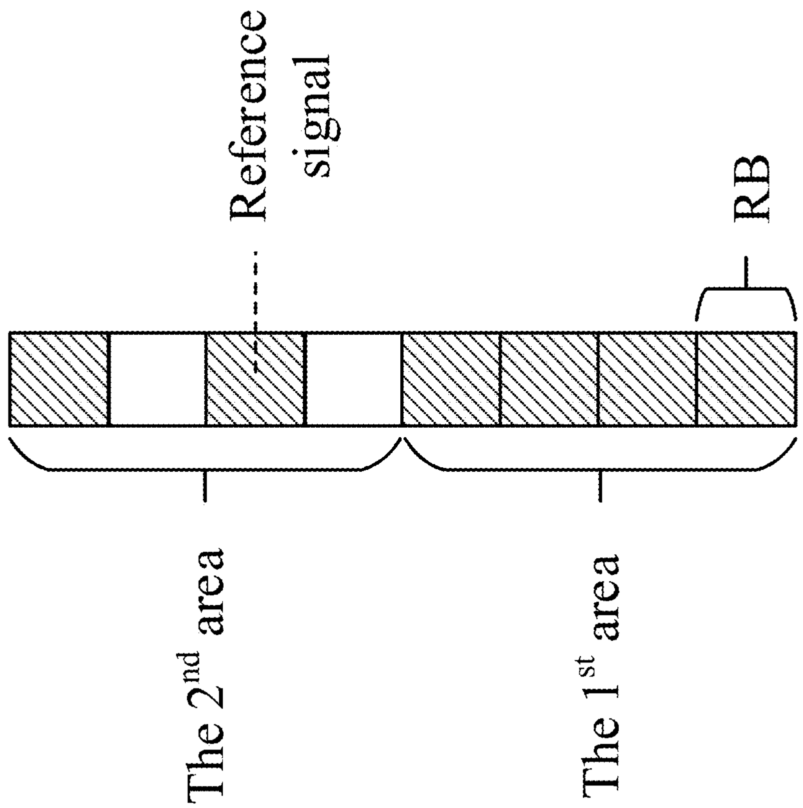
FIG. 7 shows an example of transmission resources configured for reference signal transmission.

FIG. 7 is another example. Similarly, there are 8 RBs in the frequency domain in total and they are divided into two areas, i.e., the $1^{st}$ area and the $2^{nd}$ area. The reference signal is transmitted in every RE of the all the 4 RBs in the $1^{st}$ area. The reference signal is transmitted in every RE of the even RBs in the $2^{nd}$ area.

The reference signal can be transmitted together with the data channel, e.g., PDSCH and PUSCH, which may be similar to the existing DMRS for PDSCH and PUSCH. The resources for reference signal are not available for the data channel. In other words, then mapping the data channel to the REs, the data channel won't map to these REs used for the reference signal.

In this case, the reference signal is transmitted within the frequency resource of the data channel. The reference signal is transmitted in one or multiple symbols of the data channel. If the data channel is transmitted fully within one area, then the frequency density of the reference signal is the frequency density associated with the area. If the data channel is transmitted over more than one area, then the frequency density of the associated area is used for the frequency resource of the reference signal that is within the associated area. Thus, there can be multiple frequency densities for one reference signal.

Figure 8:
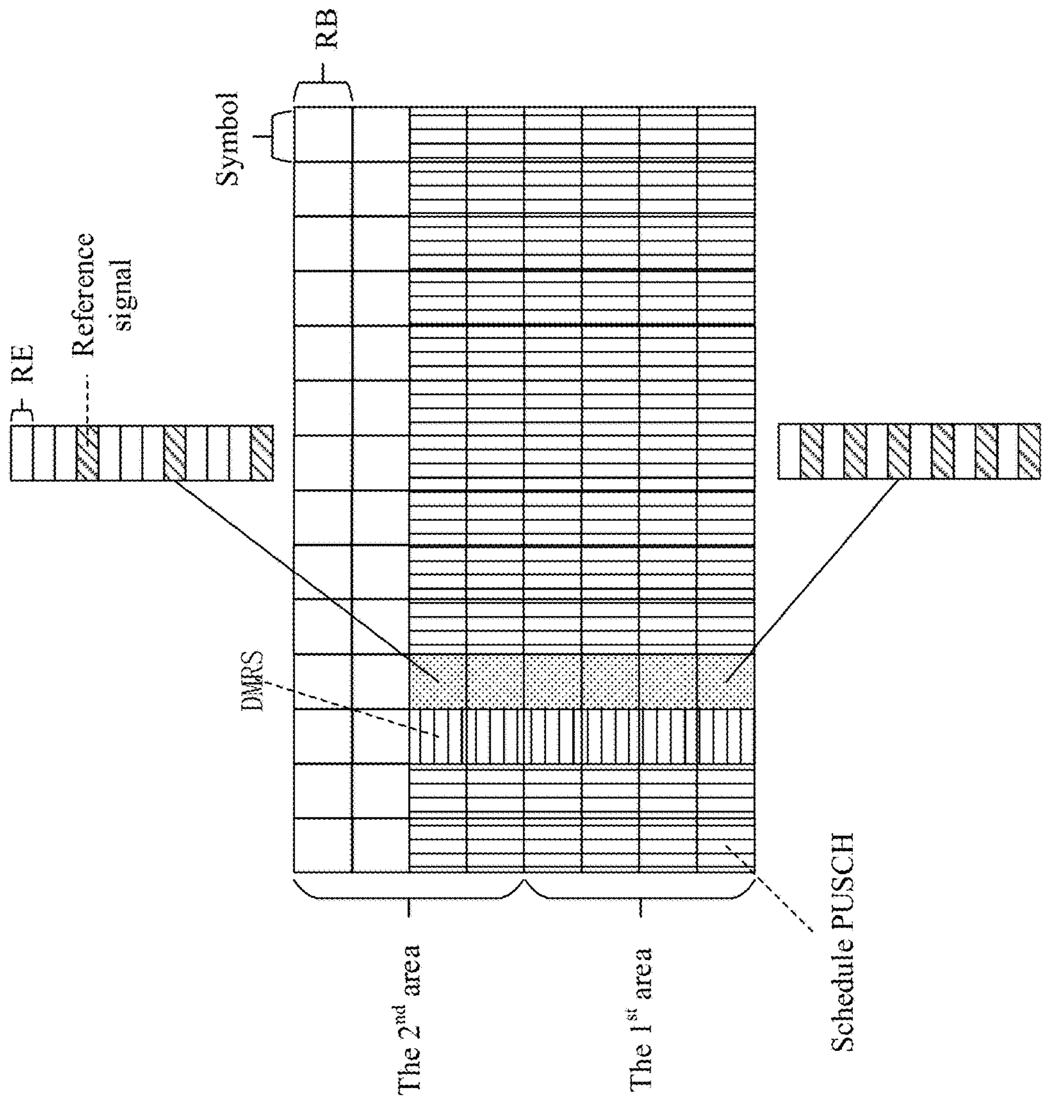
FIG. 8 shows an example of transmission resources configured for reference signal transmission.

Take FIG. 8 as an example, there are 8 RBs in total. Each RB has 12 REs. The 4 RBs in the lower part are in the $1^{st}$ area and the other 4 RBs are in the $2^{nd}$ area. The PUSCH is scheduled in the lower 6 RBs and is transmitted in all the 14 symbols in time domain. The $3^{rd}$ symbol is used for transmitting DMRS and the reference signal for interference measurement is transmitted in the $4^{th}$ symbol. Since the PUSCH is transmitted across 2 areas, the frequency density for the reference signal is different for different area. In the $1^{st}$ area, the frequency density is higher, i.e., the reference signal is transmitted in odd REs of all the 4 RBs. In the $2^{nd}$ area, the reference is transmitted in the $1^{st}$ RE, the $5^{th}$ RE and the $9^{th}$ RE in the $5^{th}$ and $6^{th}$ RBs.

3. Examples of Dynamic Indication of Frequency Density

Method #1: Dynamic Indication of the Frequency Density

Base station configures and indicates N areas to the UE, N is integer number larger than 1. DCI indicates the frequency density for the data channel.

If the data channel is transmitted fully within one area, then DCI indicates the corresponding frequency density for the reference signal that is transmitted together with the data channel. The frequency density can be directly transmitted by the DCI or it can be configured by the RRC signaling and indicated by the DCI. The DCI can also indicate there is no reference signal transmitted together with the data channel in case of low or no interference. This can be determined by an interference threshold configured by RRC signaling, e.g., RSRP (Reference Signal Receiving Power) or RSSI (Received Signal Strength Indicatoror) threshold. If the interference is smaller than the threshold, then no reference is needed. For example, if the RRC configures 4 frequency density {4, 2, 1, 0}, "4", "2" or "1" means that there are 4 REs, 2 REs or 1 RE in each RB for the reference signal, respectively. "0" means there is no reference signal transmitted together with the data channel.

If the data channel is transmitted over more than one area, then DCI indicates the corresponding frequency density for the reference signal for each area. RRC signaling configures the association between an index and the corresponding frequency density for each area. DCI indicates the index and thus UE can determine the corresponding frequency density for each area.

Take FIG. 8 as an example, the RRC signaling configures the following association between the index and the corresponding frequency density for each area. Similarly, "0" means there is no reference signal for the corresponding area. In FIG. 8, DCI indicates index 0 for the UE. Thus, UE transmits PUSCH according to the frequency density associated with index 0, i.e., 6 for the $1^{st}$ area, 3 for the $2^{nd}$ area. This is shown in Table 1.

TABLE 1

| Index | Frequency density |
|---|---|
| 0 | 6 for the $1^{st}$ area, 3 for the $2^{nd}$ area. |
| 1 | 6 for the $1^{st}$ area, 1 for the $2^{nd}$ area. |
| 2 | 6 for the $1^{st}$ area, 0 for the $2^{nd}$ area. |
| 3 | 0 for the $1^{st}$ area, 0 for the $2^{nd}$ area. |

Method #2: Dynamic Indication of the Frequency Resource of the Area and Frequency Density DCI indicates the frequency resource of the area and frequency density for the data channel. One of the following alternatives can be used to indicate the frequency resource of the area and frequency density.

Alt.1. RRC signaling configures a first index associated with the frequency resource partition for each area and a second index associated with the frequency density. DCI indicates the first index and the second index to the UE, thus UE can determine the frequency density for the corresponding frequency resource. The frequency resource partition for each area is configured by one of the alternatives in Embodiment 2.

For example, each area can be determined by the frequency domain resource (or frequency resource for simplicity) and time domain resource. The frequency domain resource of area can be determined by one of the following alternatives.

Alt.1. Base station configures the frequency resources associated with each area. Each area can have one or multiple RBs or PRGs (Resource Block Groups).

Alt.2. Base station configures the number of areas. Base station and/or UE determines the frequency resources of each area based on the number of areas and the total number of RBs/PRGs of downlink or uplink. For example, if the total number of RBs for uplink is 90 RBs and the number of areas is 3, then each area contains 30 RBs. If the total number of RBs are not divisible by the number of areas, specific rules can be used to determine the number of RBs for each area. For example, the first (or last) area can have less RBs and all other areas can have the same number of RBs. If the total number of RBs for uplink is 86 RBs and the number of areas is 3, then first area and second area will have ⌈86/3⌉=29 RBs and the third area will have 86−29*2=28 RBs.

Alt.2. RRC signaling configures an index associated with the frequency resource partition for each area and the corresponding frequency density. DCI indicates the index to the UE, UE can determine the frequency density for the corresponding frequency resource. The frequency resource partition for each area is configured by one of the alternatives in Embodiment 2.

Take FIG. 8 as an example, as shown below, RRC signaling configures an index associated with the frequency resource partition for each area and the corresponding frequency density. In this example, DCI indicates index 0 to the UE. Thus, the frequency resources are partitioned into two areas and the frequency resources for each area can be determined, e.g., each area has the same number of RBs. Table 2 shows resource density examples for this case.

TABLE 2

| Index | Number of areas | Frequency density |
|---|---|---|
| 0 | 2 | 6 for the $1^{st}$ area, 3 for the $2^{nd}$ area. |
| 1 | 2 | 6 for the $1^{st}$ area, 1 for the $2^{nd}$ area. |
| 2 | 2 | 0 for the $1^{st}$ area, 0 for the $2^{nd}$ area. |
| 3 | 3 | 6 for the $1^{st}$ area, 1 for the $2^{nd}$ area, 6 for the $3^{rd}$ area. |

Method #3: Other Example Methods

The following methods can also be used to indicate the frequency density.

Method 3-1: DCI indicates the number of frequency densities. If DCI indicates M as the number of frequency densities, where M is integer number larger than 1, the frequency resources of the scheduled data channel is partitioned into M areas. For example, if the total number of RBs for the scheduled data is 90 RBs and the number of areas is 3, then each area contains 30 RBs. If the total number of RBs are not divisible by the number of areas, specific rules can be used to determine the number of RBs for each area. For example, the first (or last) area can have less RBs and all other areas can have the same number of RBs. If the total number of RBs for uplink is 86 RBs and the number of areas is 3, then first area and second area will have ⌈86/3⌉=29 RBs and the third area will have 86−29*2=28 RBs. The frequency density for each area configured by the RRC signaling or specified in the specification.

Method 3-2: DCI indicates a number of frequency densities. If DCI indicates M frequency densities, where M is integer number larger than 1, the frequency resources of the scheduled data channel is partitioned into M areas.

4. Time-Domain Resource Examples

The reference signal can be transmitted in one or multiple symbols within the scheduled data channel. The DMRS is used for measuring the channel state. To facilitate the PDSCH demodulation, the DMRS symbol or at least some of the DMRS symbols are in the front of the scheduled PDSCH/PUSCH. For type A PDSCH/PUSCH scheduling, the DMRS is usually at the third or fourth symbol (counted from the $1^{st}$ symbol) of the slot. For Type B PDSCH/PUSCH scheduling, the DMRS is usually at the first symbol of the scheduled PDSCH/PUSCH.

The reference signal is used for measuring the interference and thus help demodulate the data channel. To facilitate the demodulation of data channel (e.g., getting the interference measurement result earlier) and guarantee the interference measurement accuracy, the reference signal is placed next to the DMRS with the following alternatives.

Alt.1: The reference signal is placed in the next symbol of the DMRS. If two consecutive symbols are used as DMRS, then the reference signal is placed in the next symbol of the last DMRS symbol.

Alt.2: The reference signal is placed in the previous symbol of the DMRS. If two consecutive symbols are used as DMRS, then the reference signal is placed in the previous symbol of the first DMRS symbol.

The DMRS symbols can also be transmitted in the middle or in the end part of the scheduled data channel depending on the configuration. The reference signal can be configured in the next symbol or in the previous symbol of one or multiple DMRS symbols.

Take FIG. 8 as an example, only one symbol DMRS is transmitted and the reference signal is transmitted in the next symbol of the DMRS.

Figure 9:
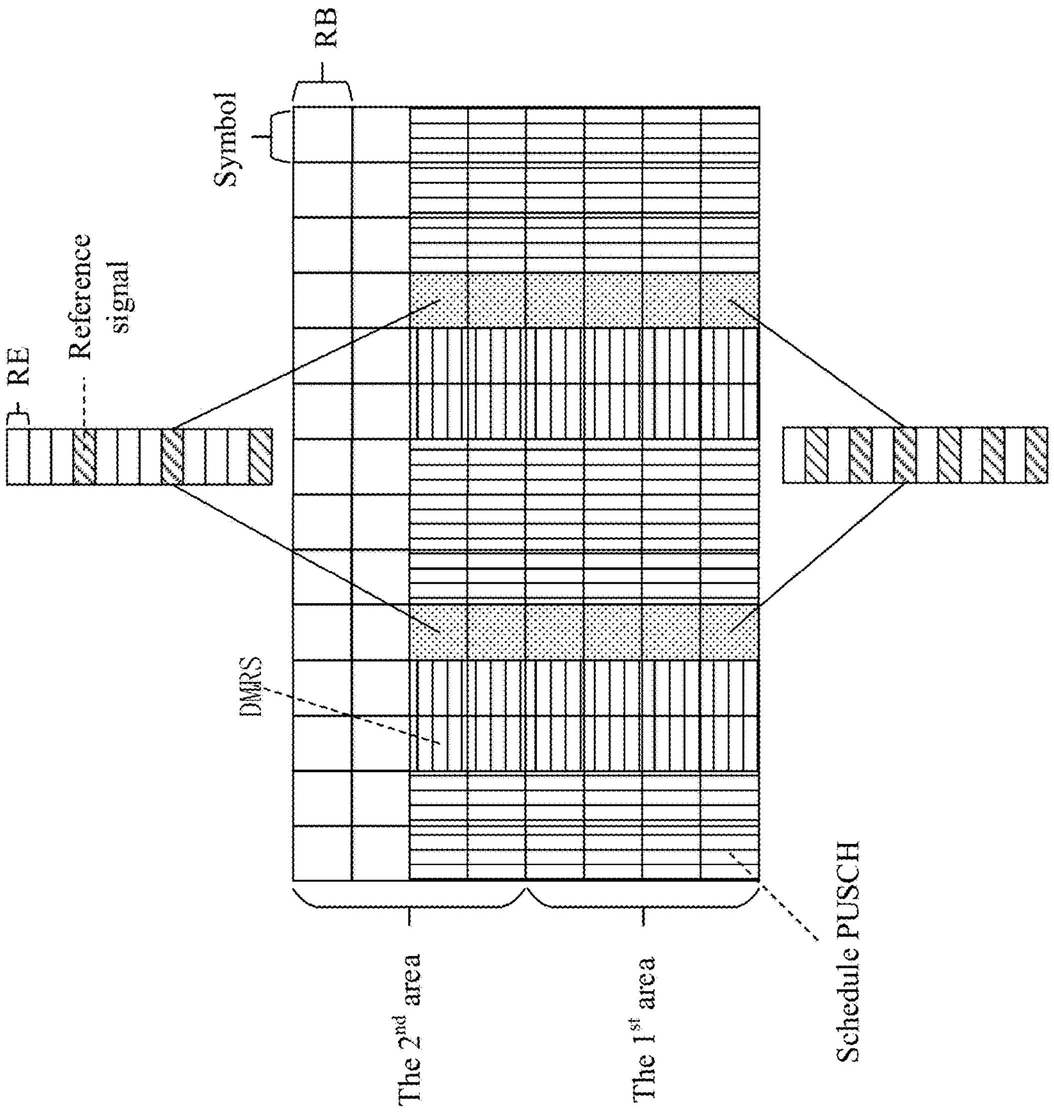
FIG. 9 shows an example of transmission resources configured for reference signal transmission.

Take FIG. 9 as an example, 4 symbols in total are transmitted and the four symbols are divided into two sets. The first set of DMRS symbols are in the front and occupy two consecutive symbols. The second set of DMRS symbols are in the end and also occupy two consecutive symbols. In this example, the reference signal is transmitted in the next symbol of the last DMRS symbol of each set of DMRS symbols.

5. Examples of Sequence Transmitted Over the Reference Signal

The transmitter doesn't transmit any signal on these resources for the reference signal and thus the receiver can use it to measure the interference state.

Alternatively, the transmitter may transmit the following sequence over these resource for the reference signal.

Alt.1. Pseudo-random sequence;

Alt.2. Low-PAPR (peak to average power) sequence, e.g., Zadoff-Chu sequence;

Alt.3. Reusing the sequence for DMRS;

Alt.4. Reusing the sequence for SRS;

Alt.5. Reusing the sequence for CSI-RS.

6. Examples of Different Time Densities for Reference Signal

The interference can also be different between different symbols/slots. Take FIG. 2 as an example, the interference in Slot 0 or Slot 4 is lower than the interference in Slot 1, Slot 2 or Slot 3 because there is downlink to uplink interference in base station side and uplink to downlink interference in UE side. Thus, the reference signal also has different time densities in time domain. For example, in Slot 0 and Slot 4, the reference signal is transmitted in two symbols in each slot, respectively. While in Slot 1, Slot 2 and Slot 3, the reference signal is transmitted in 4 symbols in each slot, respectively.

Different methods can be applied to configure or indicate different time densities for the reference signal.

Figure 10:
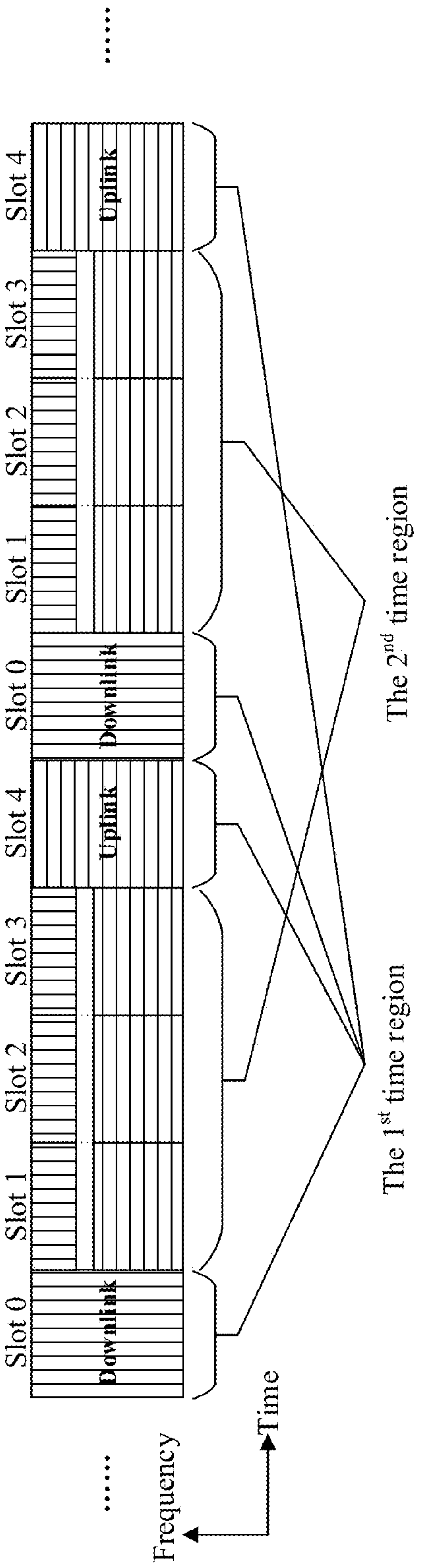
FIG. 10 shows an example of transmission resources configured for reference signal transmission.

Method #1: Base Station Configures Different Time Region and Time Densities Associated with the Time Region The time region contains one or more symbols/slots and can be defined as a time domain pattern. For example, in FIG. 10, the $1^{st}$ time domain pattern can be Slot 0 and Slot 4 in each period and the period is 5 slots. The $2^{nd}$ time domain pattern can be Slot 1, Slot 2 and Slot 3 in each period.

If the reference signal is transmitted in one time region, the time density of the reference signal is determined by the time region where the reference signal is transmitted.

If the reference signal is transmitted across more than one time region, the time density of the reference signal is determined by the following alternatives.

Alt.1 the time density of the reference signal is determined by the time region where the reference signal is transmitted.

Alt.2 the time density of the reference signal is determined by the time region overlapping with the first symbol of the reference signal.

Alt.3 the time density of the reference signal is determined by the time region overlapping with the last symbol of the reference signal.

Method #2: Base Station Indicates the Time Density for the Reference Signal Via DCI or MAC-CE RRC signaling configures a set of configurations that includes an index and the corresponding time density associated with the index to the UE. DCI or MAC-CE indicates the index to the UE. UE determines the time density of the reference signal based on the indication. One of the indexes indicates that the reference signal is not transmitted.

For example, RRC signaling configures the following association to the UE. Index 0 refers to time density "4", which means the reference signal is transmitted in 4 symbols in each slot. There are many common solutions to determine which 4 symbols are used, e.g., configured by RRC signaling, the $1^{st}$ and $2^{nd}$ symbol plus the last and second last symbol of the scheduled data channel. Index 3 refers to time density 0, which means the reference signal is not transmitted. Table 3 shows an example of such a configuration.

TABLE 3

| Index | Time density |
|---|---|
| 0 | 4 |
| 1 | 2 |
| 2 | 1 |
| 3 | 0 |

DCI or MAC-CE can also indicates more than one time densities to the UE. If the DCI schedules a PDSCH/PUSCH with N−1 repetitions (thus N PDSCH/PUSCH transmissions in total) or if the DCI schedules N PDSCH/PUSCH transmissions with different transmission blocks, DCI indicates M time densities for the PDSCH/PUSCH via the following alternatives. N is integer number larger than 1. M is integer number larger than 1 and M is not larger than N. Typically, M is equal to 2.

Alt.1. The reference signal transmitted together with the first $\lfloor N/M \rfloor$PDSCH/PUSCH transmissions are transmitted with the $1^{st}$ time density indicated by the DCI. The reference signal transmitted together with the second $\lfloor N/M \rfloor$PDSCH/PUSCH transmissions are transmitted with the $2^{nd}$ time density indicated by the DCI, and so on.

Alt.2. The reference signal transmitted together with the $((i \bmod M)+1)^{th}$ PDSCH/PUSCH are transmitted with the $((i \bmod M)+1)^{th}$ time density indicated by the DCI. i is the PDSCH/PUSCH index starting from 0. For example, if DCI schedules 4 PDSCH transmissions and indicates 2 time densities, then the time density for the reference signal transmitted together with the $1^{st}$ PDSCH (i.e., PDSCH with index 0) is the $1^{st}$ time density indicated by the DCI. Similarly, the time density for the reference signal transmitted together with the $3^{rd}$ PDSCH (i.e., PDSCH with index 2) is the $1^{st}$ time density indicated by the DCI. The time density for the reference signal transmitted together with the $2^{nd}$ PDSCH (i.e., PDSCH with index 1) is the $2^{nd}$ time density indicated by the DCI. The time density for the reference signal transmitted together with the $4^{th}$ PDSCH (i.e., PDSCH with index 3) is the $2^{nd}$ time density indicated by the DCI.

7. Examples of Different Frequency Densities for DMRS

The interference may be dynamic over time domain. Take FIG. 2 as example, in Slot 0 and Slot 4, the interference may be smaller compared with the interference in Slot 1/2/3. Thus, two DMRS can be defined. The first DMRS is with one frequency density and the second DMRS is with another frequency density. DCI indicates the frequency density of the transmitted DMRS for the scheduled data channel.

In summary, M sets of DMRS can be defined and each set of DMRS is with one frequency density. DCI indicates one out of the M sets of DMRS for the scheduled data channel. In other words, DCI indicates one out of the M frequency densities of the transmitted DMRS for the scheduled data channel.

For example, in this embodiment, base station doesn't need to configure or indicate any area. Base station just indicates the corresponding frequency density to the receiver.

8. Examples of Reference Signal Transmitted Overlapping with Guard Period

For subband full duplex systems, one or multiple symbols will be reserved for transiting the communication direction. Take FIG. 10 as an example, in the Slot 1, the third and fourth symbol are reserved as GP (Guard period) for transition from downlink to uplink. Similarly, in Slot 3, the 11th and 12th symbol are reserved as guard period.

It is noted that the reference signal here is not limited to reference signal with different frequency densities. It can be any reference signal.

Base station and UE don't transmit any signal during the guard period. Thus, in subband full duplex system, the DL symbols overlapping with the guard periods and UL symbols overlapping with the guard periods can be used to transmit reference signals. Since base station and UE don't transmit any signal during the guard period, the reference signals transmitted in the DL symbols (or UL symbols) overlapping with the guard periods can be protected with less interference.

The reference signals transmitted in the DL symbols overlapping with the guard periods can be one of the following.

- Alt.1. DMRS. When UE receives DMRS in the DL symbols overlapping with the guard periods, there is no other UE transmitting uplink.
- Alt.2. CSI-RS. When UE or other base station receives DMRS in the DL symbols overlapping with the guard periods, there is no other UE transmitting uplink.

The reference signals transmitted in the UL symbols overlapping with the guard periods can be one of the following.

- Alt.1. DMRS. When base station receives DMRS in the UL symbols overlapping with the guard periods, there is no interference from the downlink of itself.
- Alt.2. SRS. When base station receives SRS in the UL symbols overlapping with the guard periods, there is no interference from the downlink of itself.

The guard periods can be configured as flexible symbols thus base station and UE don't transmit any signal on the guard periods.

Some preferred embodiments may incorporate the following solution features.

With reference to Sections 1 to 6, some example solutions implemented at a transmitter-side may be as follows.

Figure 11A:
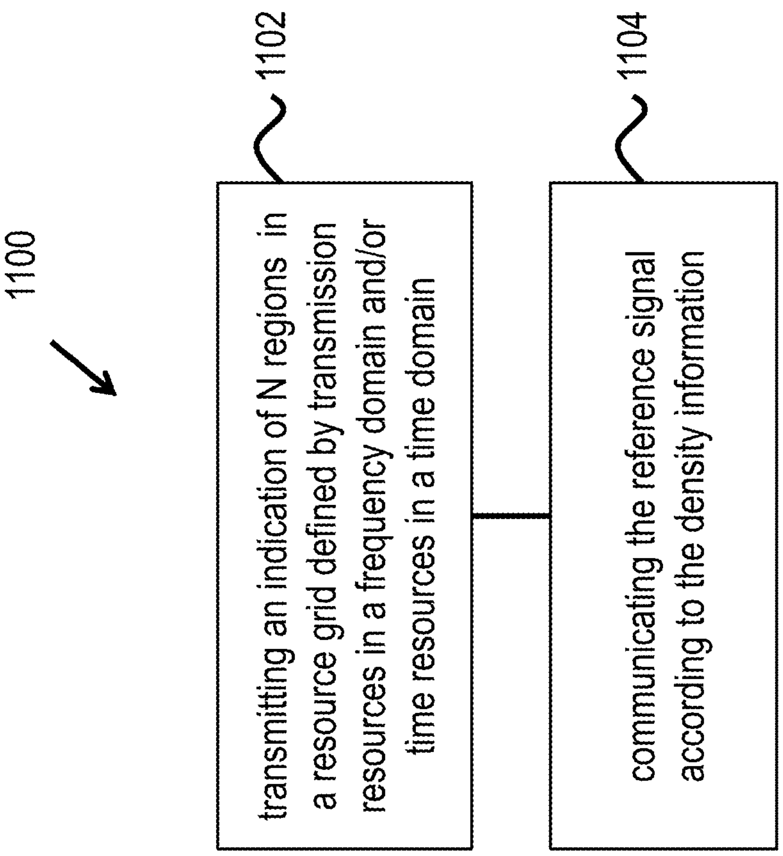
FIG. 11A-11B are flowcharts of example wireless communication methods performed by a network device.

1. A method of wireless communication (e.g., method 1100 depicted in FIG. 11A), comprising: transmitting (1102), from a first communication device to a second communication device, an indication of N regions in a resource grid defined by transmission resources in a frequency domain and/or time resources in a time domain, wherein each of the N regions has a corresponding resource density indicative of a density of time-frequency resources configured for reference signal transmissions, wherein N is an integer greater than 1; and communicating (1104) the reference signal between the first communication device and the second communication device according to the density information. Various configurations and examples of the regions (also called "area") are described with reference to FIGS. 2-10.

With reference to Section 2, some example solutions may be as follows.

2. The method of solution 1, further including: configuring, for each of the N regions, frequency resources in the frequency domain, wherein the frequency resources in the frequency domain are defined in units of resource blocks or resource block groups.
3. The method of solution 1, wherein the density information signals a value of N.
4. The method of solution 2-3, wherein, in case that the time resources are not indicated for a particular region, then the resource density is interpreted as being applicable to all time units of the particular region.
5. The method of solution 2-3, wherein, in case that the time resources are not indicated for a particular region, then all time units of during which the first communication device or the second communication device transmits are interpreted as being applicable to all time units of the particular region.
6. The method of solutions 2-3, further including: configuring, for each of the N regions, time resources in the time domain, wherein the time resources are defined for each region in units of transmission symbols or time slots.
7. The method of any of solutions 1-6, wherein resource densities of the N region are indicated using a scaling factor with respect to a resource density of a reference region.
8. The method of any of solutions 1-7, wherein the resource density is indicated in a medium access control (MAC) control element (CE).
9. The method of any of solutions 1-8, further including: transmitting a reference signal using transmission resources in one or more of the N regions, wherein, in each region, the reference signal is transmitted using a density determined according to a rule.
10. The method of solution 9, wherein the rule specifies to use each region's resource density for the reference signal.
11. The method of any of solutions 1-10, further including: transmitting a reference signal by multiplexing with a data channel in along the frequency domain and/or the time domain.

With reference to Section 3, some example solutions may be as follows.

12. The method of solution 1, comprising: transmitting an indication message, by the first communication device to the second communication device, resources used for a data channel transmission and reference signal transmission such that: in case that the data channel entirely falls within a particular region of the N regions, then the indication message indicates a resource density of the reference signal transmission for the particular region; or in case that the data channel occupies more than one regions of the N region, the indication message indicates resource density of the reference signal for the more than one regions; or in case that no reference signal is transmitted with the data channel, then the indication message indicates absence of reference signal transmissions.

13. The method of solution 12, wherein, upon determining that an estimated interference on a wireless channel between the first communication device and the second communication device is below a threshold, the indication message indicates the absence of reference signal transmissions. The threshold may be a pre-defined number or may be implementation-specific.

14. The method of solutions 12-13, wherein, in a region, the data channel transmission and reference signal transmissions are configured such that resources assigned to the reference channel transmissions are made unavailable for the data channel transmissions.

15. The method of solution 14, wherein the data channel transmissions comprise physical downlink shared channel (PDSCH) transmissions or physical uplink shared channel (PUSCH) transmissions.

16. The method of solution 12-15, wherein the indication message is carried in a downlink control information (DCI).

17. The method of solutions 12-16, wherein the indication indicates a configuration that is previously configured by a higher layer message.

18. The method of solution 17, wherein the higher layer message is a radio resource control (RRC) message that configures the N regions and/or resource densities for the N regions.

19. The method of solution 12, wherein the indication message and the indication are communicated in a downlink control indicator (DCI) message.

With reference to Section 4, some example solutions may be as follows.

20. The method of solution 1 wherein the N regions are adjacent in time domain to DMRS transmissions.

21. The method of solution 1, wherein the N regions are placed in a next symbol after last DMRS symbol.

22. The method of solution 1, wherein the N regions are placed in a previous symbol adjacent to first DMRS symbol.

With reference to Section 6, some example solutions may be as follows.

23. The method of solution 1, wherein the resource density corresponds density along the time domain.

24. The method of solution 23, wherein the N regions are configured with different time densities of reference signals, the method further comprising transmitting a reference signal using transmission resources in one or more of the N regions, wherein, in each region, the reference signal is transmitted using a density determined according to a rule.

25. The method of solution 24, wherein the rule specifies that, in case that the reference signal uses transmission resources of a single region of the N regions, the reference signal is transmitted using a time-domain resource density associated with the single region.

26. The method of solution 24, wherein the rule specifies that, in case that the reference signal uses transmission resources of multiple regions of the N regions, the reference signal is transmitted using a time-domain resource density associated with each of the multiple regions when the reference signal is transmitted in that region.

27. The method of solution 24, wherein the rule specifies that, in case that the reference signal uses transmission resources of multiple regions of the N regions, the reference signal is transmitted using a time-domain resource density corresponding to that of a first region that contains a first symbol used for the transmission of the reference signal.

28. The method of any of solutions 23-27, wherein the time density is configured using indexes representing different values in a radio resource control (RRC) message and indicated by a medium access control control element (MAC CE) or a downlink control information (DCI).

29. The method of solution 28, wherein one index indicates that no reference signal transmission is performed.

30. The method of any of solutions 1-29, wherein the reference signal comprises a pseudo-random sequence or a low peak to average power ratio sequence or a same sequence as demodulation reference signal or a sounding reference signal or a channel state information reference signal.

31. The method of any of solutions 1-29, wherein the reference signal comprises a zero-power transmission in which no signal is transmitted.

With reference to Sections 1-6, some example solutions implemented at a receiver-side may be as follows.

Figure 11B:
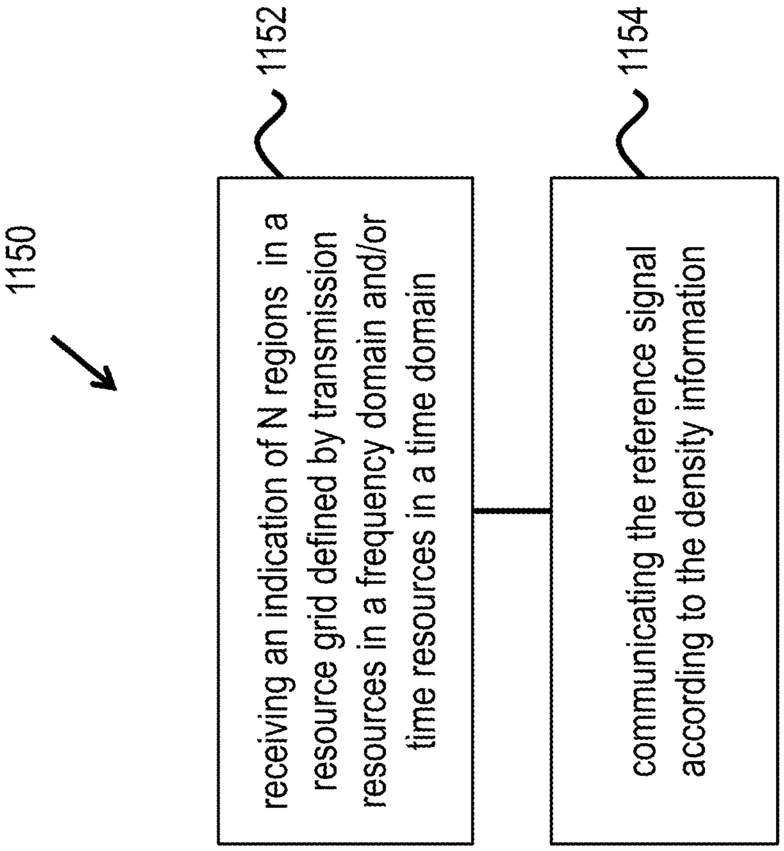

32. A method of wireless communication (e.g., method 1150 depicted in FIG. 11B), comprising: receiving (1152), from a first communication device by a second communication device, an indication of N regions in a resource grid defined by transmission resources in a frequency domain and/or time resources in a time domain, wherein each of the N regions has a corresponding resource density indicative of a density of time-frequency resources configured for reference signal transmissions, wherein N is an integer greater than 1; and communicating (1154) the reference signal between the first communication device and the second communication device according to the density information. Various configurations and examples of the regions (also called "area") are described with reference to FIGS. 2-10.

With reference to Section 2, some example solutions may be as follows.

33. The method of solution 32, wherein, for each of the N regions, frequency resources are configured in the frequency domain, wherein the frequency resources in the frequency domain are defined in units of resource blocks or resource block groups.

34. The method of solution 32, wherein the density information signals a value of N.

35. The method of solution 33-34, wherein, in case that the time resources are not indicated for a particular region, then the resource density is interpreted as being applicable to all time units of the particular region.

36. The method of solution 33-34, wherein, in case that the time resources are not indicated for a particular region, then all time units of during which the first communication device or the second communication device transmits are interpreted as being applicable to all time units of the particular region.

37. The method of solutions 33-34, wherein, for each of the N regions, time resources are configured in the time domain, wherein the time resources are defined for each region in units of transmission symbols or time slots.

38. The method of any of solutions 32-37, wherein resource densities of the N region are indicated using a scaling factor with respect to a resource density of a reference region.

39. The method of any of solutions 32-38, wherein the resource density is indicated in a medium access control (MAC) control element (CE).

40. The method of any of solutions 32-39, further including: receiving a reference signal using transmission resources in one or more of the N regions, wherein, in each region, the reference signal is transmitted using a density determined according to a rule.

41. The method of solution 40, wherein the rule specifies to use each region's resource density for the reference signal.

42. The method of any of solutions 32-41, further including: receiving a reference signal by multiplexing with a data channel in along the frequency domain and/or the time domain.

With reference to Section 3, some example solutions may be as follows.

43. The method of solution 32, comprising: receiving an indication message, from the first communication device by the second communication device, indicating resources used for a data channel transmission and reference signal transmission such that: in case that the data channel entirely falls within a particular region of the N regions, then the indication message indicates a resource density of the reference signal transmission for the particular region; or in case that the data channel occupies more than one regions of the N region, the indication message indicates resource density of the reference signal for the more than one regions; or in case that no reference signal is transmitted with the data channel, then the indication message indicates absence of reference signal transmissions.

44. The method of solution 43, wherein, upon determining that an estimated interference on a wireless channel between the first communication device and the second communication device is below a threshold, the indication message indicates the absence of reference signal transmissions. The threshold may be a pre-defined number or may be implementation-specific.

45. The method of solutions 43-44, wherein, in a region, the data channel transmission and reference signal transmissions are configured such that resources assigned to the reference channel transmissions are made unavailable for the data channel transmissions.

46. The method of solution 45, wherein the data channel transmissions comprise physical downlink shared channel (PDSCH) transmissions or physical uplink shared channel (PUSCH) transmissions.

47. The method of solution 43-46, wherein the indication message is carried in a downlink control information (DCI).

48. The method of solutions 43-47, wherein the indication indicates a configuration that is previously configured by a higher layer message.

49. The method of solution 48, wherein the higher layer message is a radio resource control (RRC) message that configures the N regions and/or resource densities for the N regions.

50. The method of solution 43, wherein the indication message and the indication are communicated in a downlink control indicator (DCI) message.

With reference to Section 4, some example solutions may be as follows.

51. The method of solution 32, wherein the N regions are adjacent in time domain to DMRS transmissions.

52. The method of solution 32, wherein the N regions are placed in a next symbol after last DMRS symbol.

53. The method of solution 32, wherein the N regions are placed in a previous symbol adjacent to first DMRS symbol.

With reference to Section 6, some example solutions may be as follows.

54. The method of solution 32, wherein the resource density corresponds density along the time domain.

55. The method of solution 54, wherein the N regions are configured with different time densities of reference signals, the method further comprising receiving a reference signal using transmission resources in one or more of the N regions, wherein, in each region, the reference signal is transmitted using a density determined according to a rule.

56. The method of solution 55, wherein the rule specifies that, in case that the reference signal uses transmission resources of a single region of the N regions, the reference signal is transmitted using a time-domain resource density associated with the single region.

57. The method of solution 55, wherein the rule specifies that, in case that the reference signal uses transmission resources of multiple regions of the N regions, the reference signal is transmitted using a time-domain resource density associated with each of the multiple regions when the reference signal is transmitted in that region.

58. The method of solution 55, wherein the rule specifies that, in case that the reference signal uses transmission resources of multiple regions of the N regions, the reference signal is transmitted using a time-domain resource density corresponding to that of a first region that contains a first symbol used for the transmission of the reference signal.

59. The method of any of solutions 54-58, wherein the time density is configured using indexes representing different values in a radio resource control (RRC) message and indicated by a medium access control control element (MAC CE) or a downlink control information (DCI).

60. The method of solution 59, wherein one index indicates that no reference signal transmission is performed.

61. The method of any of solutions 32-60, wherein the reference signal comprises a pseudo-random sequence or a low peak to average power ratio sequence or a same sequence as demodulation reference signal or a sounding reference signal or a channel state information reference signal.

62. The method of any of solutions 32-60, wherein the reference signal comprises a zero-power transmission in which no signal is transmitted.

The above solutions may be preferably implemented as:

63. The method of any of solutions 1-62, wherein the first communication device corresponds to a base station and the second communication device corresponds to a user equipment.

64. The method of any of solutions 1-62, wherein the first communication device corresponds to a user equipment and the second communication device corresponds to a base station.

65. A wireless communication apparatus comprising a processor configured to implement a method recited in any of solutions 1-64.
66. A computer-readable medium having processor-executable code stored thereupon, the code, upon execution by the processor, causing the processor to implement a method recited in any of solutions 1-64.

Figure 12:
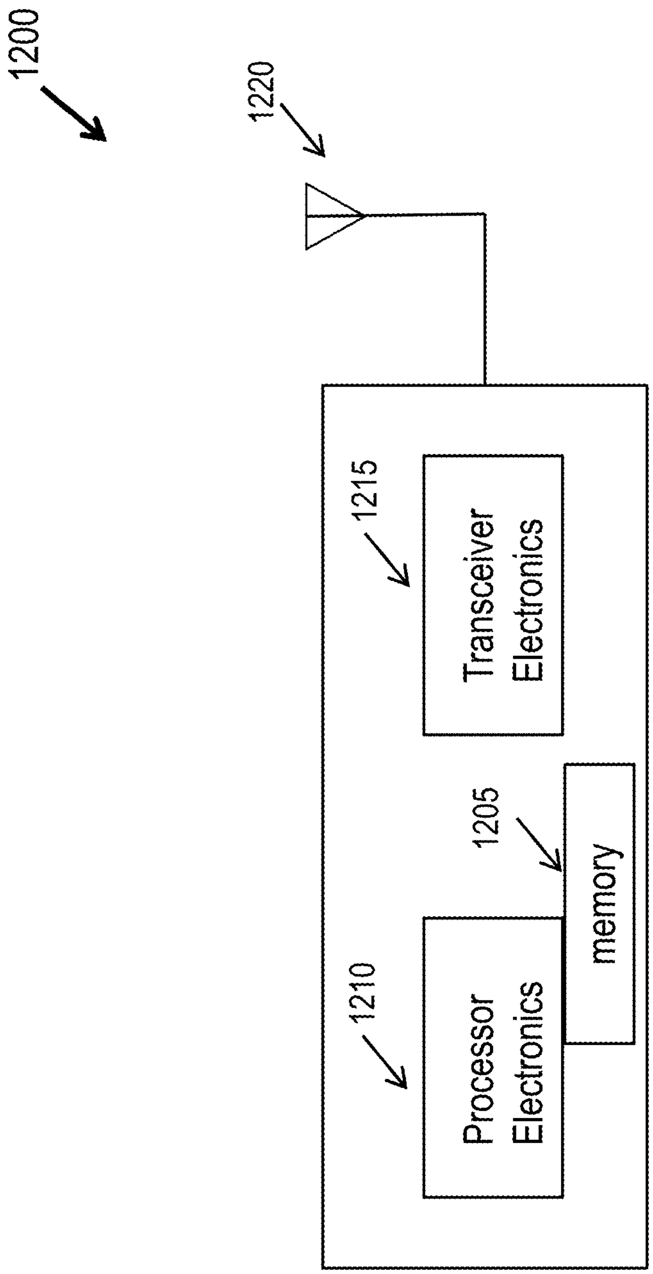
FIG. 12 is a block diagram of an example of a wireless communication apparatus.

FIG. 12 is a block diagram of an example implementation of a wireless communication apparatus 1200. The methods 1100 and 1150 may be implemented by the apparatus 1200. In some embodiments, e.g., when implementing method 1100, the apparatus 1200 may be the first communication device such as a base station or a network device of a wireless network and the second communication device may be UE. In some embodiments, e.g., when implementing method 1150, the apparatus 1200 may be a the second communication device such as UE. The apparatus 1200 includes one or more processors, e.g., processor electronics 1210, transceiver circuitry 1215 and one or more antenna 1220 for transmission and reception of wireless signals. The apparatus 1200 may include memory 1205 that may be used to store data and instructions used by the processor electronics 1210. The apparatus 1200 may also include an additional network interface to one or more core networks or a network operator's additional equipment. This additional network interface, not explicitly shown in FIG. 12, may be wired (e.g., fiber or Ethernet) or wireless.

Figure 13:
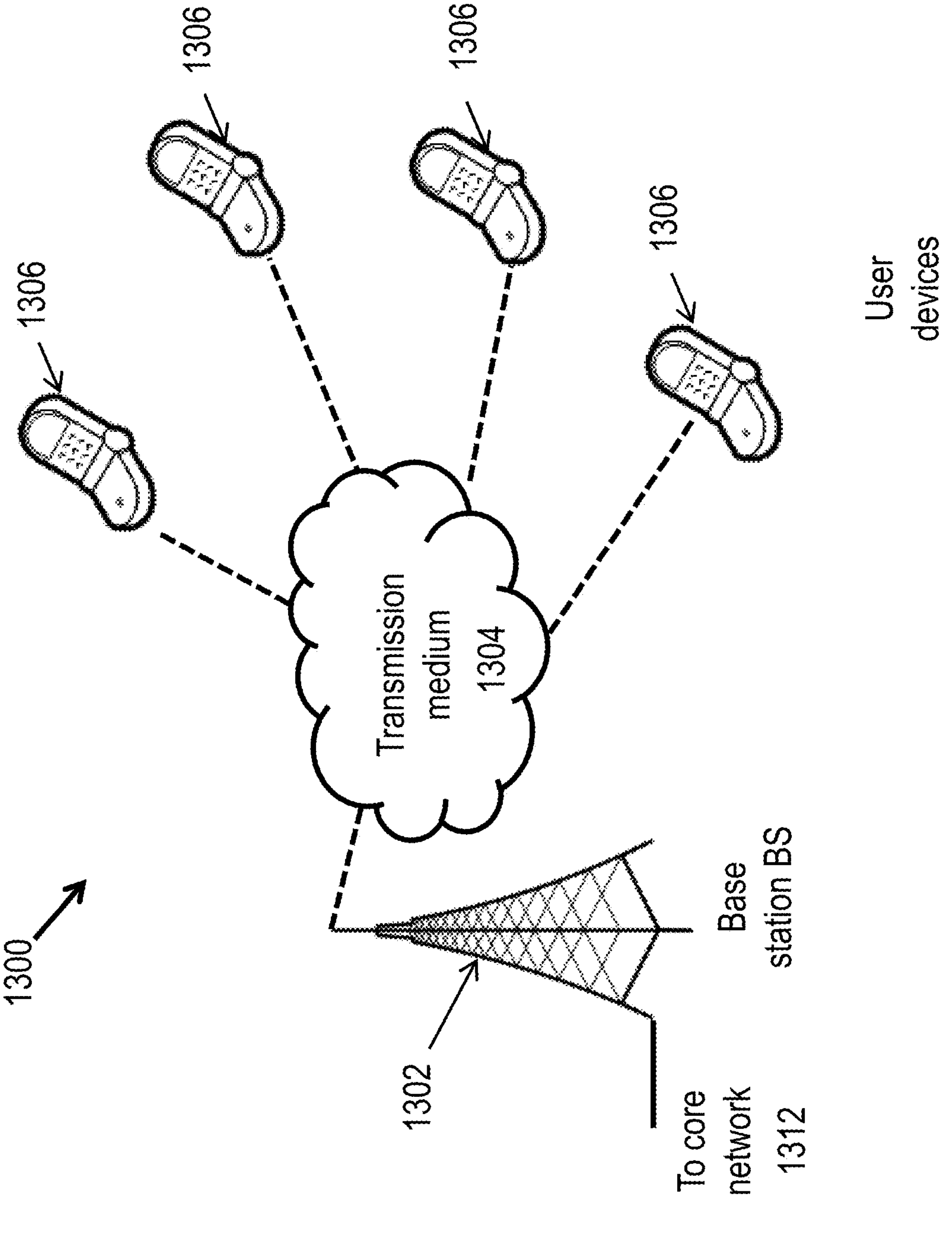
FIG. 13 shows an example wireless communications network.

FIG. 13 depicts an example of a wireless communication system 1300 in which the various techniques described herein can be implemented. The system 1300 includes a base station 1302 that may have a communication connection with core network (1312) and to a wireless communication medium 1304 to communicate with one or more user devices 1306. He user devices 1306 could be smartphones, tablets, machine to machine communication devices, Internet of Things (IoT) devices, and so on.

It will be appreciated that techniques for achieving different reference signal resource densities in time and/or frequency domain are realized. In one advantageous aspect, the disclosed techniques may be used by a transmitter (e.g., a base station) to schedule a denser resource grid of reference signals in time-frequency regions where there is a greater chance of interference, e.g., time-frequency regions where uplink and downlink transmissions occupy adjacent or proximate time slots of subcarriers. It will further be appreciated by one of skill in the art that the disclosed techniques may be used to reserve certain resource elements as zero-power transmission resources (e.g., a reference signal transmission that comprises no signal transmission). Furthermore, embodiments may be able to divide all available time-frequency resource into multiple regions (also referred to as areas in this document) and resource density may be specified on a region-by-region basis. Data and reference signal transmissions may fall entirely within a single region, or may occupy multiple regions, thereby provide a flexible resource density organization.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

The invention claimed is:

1. A method of wireless communication, comprising:

transmitting, by a first communication device to a second communication device, an indication of N regions in a resource grid defined by transmission resources in a frequency domain or time resources in a time domain, wherein each of the N regions has a corresponding resource density indicative of a density of time-frequency resources configured for reference signal transmissions, wherein N is an integer greater than 1; and communicating, by the first communication device with the second communication device, using a reference signal according to the corresponding resource density; and transmitting an indication message, by the first communication device to the second communication device, indicating resources used for a data channel transmission and reference signal transmission such that:

in a case that the data channel entirely falls within a particular region of the N regions, the indication message indicates a resource density of reference signal transmissions for the particular region; or in a case that the data channel occupies more than one region of the N regions, the indication message indicates a resource density of reference signal transmissions for the more than one region; or in a case that no reference signal is transmitted with the data channel, the indication message indicates an absence of reference signal transmissions.

2. The method of claim 1, further comprising:

configuring, for each of the N regions, frequency resources in the frequency domain, wherein the frequency resources in the frequency domain are defined in units of resource blocks or resource block groups.

3. The method of claim 2, wherein, in a case that the time resources are not indicated for a particular region, the resource density corresponds to all time units of the particular region.

4. The method of claim 2, further comprising:

configuring, by the first communication device, for each of the N regions, time resources in the time domain, wherein the time resources are defined for each region in units of transmission symbols or time slots.

5. The method of claim 1, wherein resource densities of the N region are indicated using a scaling factor with respect to a resource density of a reference region.

6. A method of wireless communication, comprising:

receiving, from a first communication device by a second communication device, an indication of N regions in a resource grid defined by transmission resources in a frequency domain or time resources in a time domain, wherein each of the N regions has a corresponding resource density indicative of a density of time-frequency resources configured for reference signal transmissions, wherein N is an integer greater than 1; and communicating, by the second communication device with the first communication device, using a reference signal according to the corresponding resource density; and receiving an indication message, from the first communication device by the second communication device, indicating resources used for a data channel transmission and reference signal transmission such that:

in a case that the data channel entirely falls within a particular region of the N regions, the indication message indicates a resource density of reference signal transmissions for the particular region; or in a case that the data channel occupies more than one region of the N region, the indication message indicates resource density of reference signal transmissions for the more than one region; or in a case that no reference signal is transmitted with the data channel, the indication message indicates an absence of reference signal transmissions.

7. The method of claim 6, further comprising:

configuring, for each of the N regions, frequency resources in the frequency domain, wherein the frequency resources in the frequency domain are defined in units of resource blocks or resource block groups.

8. The method of claim 7, wherein, in a case that the time resources are not indicated for a particular region, the resource density corresponds to all time units of the particular region.

9. The method of claim 7, further comprising:

configuring, for each of the N regions, time resources in the time domain, wherein the time resources are defined for each region in units of transmission symbols or time slots.

10. The method of claim 6, wherein resource densities of the N region are indicated using a scaling factor with respect to a resource density of a reference region.

11. A wireless communication apparatus comprising: one or more processors and a memory storing instructions, which when executed by the one or more processors causes the apparatus to:

transmit an indication of N regions in a resource grid defined by transmission resources in a frequency domain or time resources in a time domain, wherein each of the N regions has a corresponding resource density indicative of a density of time-frequency resources configured for reference signal transmissions, wherein N is an integer greater than 1; and communicate using a reference signal according to the corresponding resource density; and transmit an indication message indicating resources for a data channel transmission and reference signal transmission such that:

in a case that the data channel entirely falls within a particular region of the N regions, the indication message indicates a resource density of reference signal transmissions for the particular region; or in a case that the data channel occupies more than one region of the N regions, the indication message indicates a resource density of reference signal transmissions for the more than one region; or in a case that no reference signal is transmitted with the data channel, the indication message indicates an absence of reference signal transmissions.

12. The apparatus of claim 11, wherein the apparatus is further caused to:

configure, for each of the N regions, frequency resources in the frequency domain, wherein the frequency resources in the frequency domain are defined in units of resource blocks or resource block groups.

13. The apparatus of claim 12, wherein, in a case that the time resources are not indicated for a particular region, the resource density corresponds to all time units of the particular region.

14. The apparatus of claim 12, wherein the apparatus is further caused to:

configure, for each of the N regions, time resources in the time domain, wherein the time resources are defined for each region in units of transmission symbols or time slots.

15. The apparatus of claim 11, wherein resource densities of the N region are indicated using a scaling factor with respect to a resource density of a reference region.

16. A wireless communication apparatus comprising: one or more processors and a memory storing instructions, which when executed by the one or more processors causes the apparatus to:

receive an indication of N regions in a resource grid defined by transmission resources in a frequency domain or time resources in a time domain, wherein each of the N regions has a corresponding resource density indicative of a density of time-frequency resources configured for reference signal transmissions, wherein N is an integer greater than 1; and communicate using a reference signal according to the corresponding resource density; and receive an indication message indicating resources for a data channel transmission and reference signal transmission such that:

in a case that the data channel entirely falls within a particular region of the N regions, the indication message indicates a resource density of reference signal transmissions for the particular region; or in a case that the data channel occupies more than one region of the N region, the indication message indicates resource density of reference signal transmissions for the more than one region; or in a case that no reference signal is transmitted with the data channel, the indication message indicates an absence of reference signal transmissions.

17. The apparatus of claim 16, wherein the apparatus is further caused to:

configure, for each of the N regions, frequency resources in the frequency domain, wherein the frequency resources in the frequency domain are defined in units of resource blocks or resource block groups.

18. The apparatus of claim 17, wherein, in a case that the time resources are not indicated for a particular region, the resource density corresponds to all time units of the particular region.

19. The apparatus of claim 17, wherein the apparatus is further caused to:

configure, for each of the N regions, time resources in the time domain, wherein the time resources are defined for each region in units of transmission symbols or time slots.

20. The apparatus of claim 16, wherein resource densities of the N region are indicated using a scaling factor with respect to a resource density of a reference region.

* * * * *